United States Patent [19]
Parker

[11] 3,836,802
[45] Sept. 17, 1974

[54] PERMANENT MAGNET MOTOR

[75] Inventor: Rollin James Parker, Greenville, Mich.

[73] Assignee: General Electric Company

[22] Filed: Sept. 6, 1973

[21] Appl. No.: 394,633

[52] U.S. Cl................ 310/154, 310/46, 310/254, 310/DIG. 4
[51] Int. Cl. ......................................... H02k 21/38
[58] Field of Search .......... 310/46, 44, DIG. 4, 152, 310/153, 154, 259, 259 A, 177, 258, 254, 40, 40 MM; 148/101–103

[56] References Cited
UNITED STATES PATENTS

| | | | |
|---|---|---|---|
| 2,513,226 | 6/1950 | Wylie | 310/154 |
| 2,513,227 | 6/1950 | Wylie | 310/154 |
| 3,083,310 | 3/1963 | Tweedy | 310/44 |
| 3,277,324 | 10/1966 | Beauddin | 310/154 |
| 3,296,471 | 1/1967 | Cochardt | 310/154 |
| 3,529,191 | 9/1970 | Henry-Baudot | 310/154 |
| 3,567,979 | 3/1971 | Jaffe | 310/46 |
| 3,663,851 | 5/1972 | Persson | 310/154 |
| 3,684,591 | 8/1972 | Martin | 148/101 |

*Primary Examiner*—R. Skudy

[57] ABSTRACT

A dynamoelectric machine in which the stator has permanent magnet poles composed of a soft magnetic material. The sides of each magnet pole have rare earth magnets around and in contact with their outer extremities. The surfaces of these rare earth magnets in contact with the magnet poles have the same polarity as the surface of the magnet poles which they contact. The rare earth magnets serve to reduce stray magnetic flux and thereby concentrate the magnetic flux in the air gap between the stator and the rotor.

6 Claims, 6 Drawing Figures

PATENTED SEP 17 1974　　3,836,802
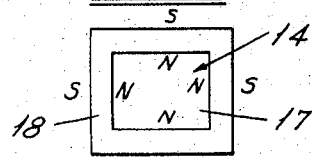
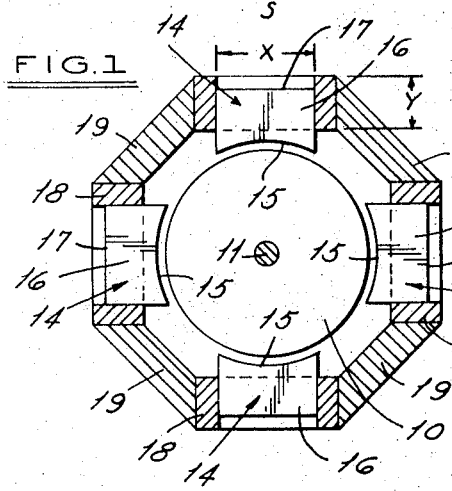
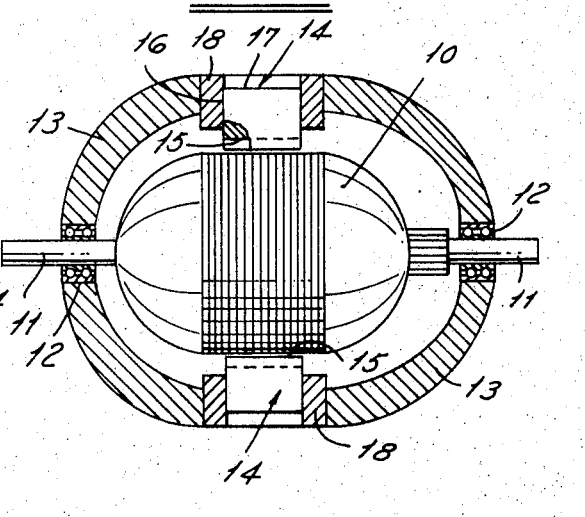
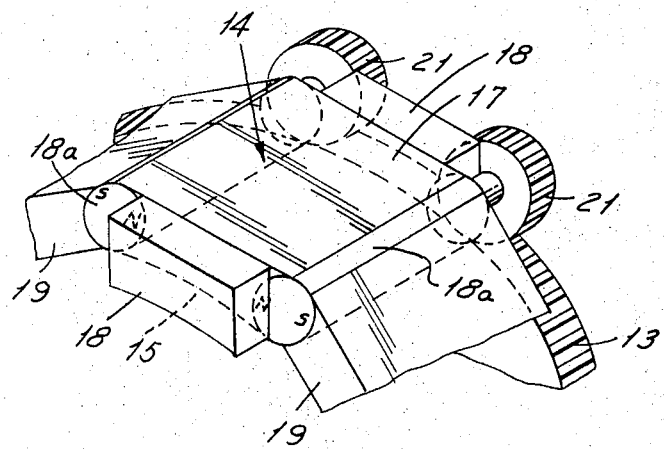
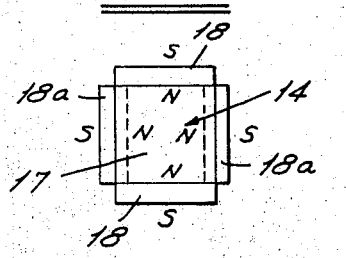
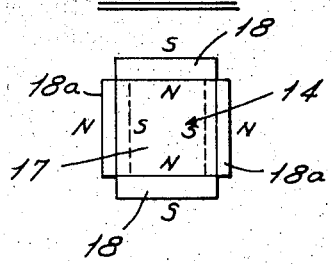

3,836,802

PERMANENT MAGNET MOTOR

BACKGROUND OF THE INVENTION

Dynamoelectric machines, such as electric motors, utilizing permanent magnets as stator poles have been known for some years. In a typical structure alnico magnets are used to form the poles of such stators. While alnico magnets have a high energy product the output of machines utilizing alnico magnets as stator poles has been limited to machines such as fractional horsepower motors. The relatively low flux density in the air gap between the stator and rotor of permanent magnet motors is the factor limiting the output of such motors.

The present invention provides a structure which greatly increases the flux density in the air gap thereby making possible multi-horsepower permanent magnet motors. Such machines may also be used as dynamos or generators.

SUMMARY STATEMENT OF THE INVENTION

In accordance with the present invention the stator of a dynamoelectric machine has at least two magnetic poles composed of a soft magnetic material such as soft iron. Each magnet pole has one end contoured and spaced a short distance from a rotor to provide an air gap. Each magnet pole also has an extending end opposite the air gap end and a side portion. Each side portion is surrounded by at least one rare earth magnet which is preferably in contact with its associated magnet pole. Each magnet has transverse orientation whereby its surface or surfaces in contact with the magnet pole have the same polarity. All external surfaces also have the same polarity which is opposite to the polarity of the internal surface. The external surfaces of adjacent rare earth magnets are joined by soft iron return path members. The casing or housing of the machine may also serve as part of the return path.

In an alternative embodiment of the invention the magnet poles are given a square cross sectional configuration and each pole piece will have a rare earth magnet for each of its four sides. Two oppositely positioned rare earth magnets are made rotatable. In this way the inner surfaces of the rare earth magnets surrounding each magnet pole may all have the same polarity or two may be rotated to give a polarity opposite the other two. There may also be gradations in between. If a motor is provided with such rotatable magnets its speed can be varied according to the setting of the rotatable rare earth magnets.

DESCRIPTION OF THE DRAWING

FIG. 1 is a schematic sectional end view of a motor made in accordance with the present invention.

FIG. 2 is a view of one of the magnet poles of the motor of FIG. 1.

FIG. 3 is a side sectional view of a motor made in accordance with the present invention.

FIG. 4 is a perspective view of a pole piece with rotatable rare earth magnets in accordance with an alternative embodiment of the invention.

FIG. 5 is a plan view of the pole piece of FIG. 4 showing the rare earth magnets in "flux on" position.

FIG. 6 is a view similar to FIG. 5 except that the rotatable rare earth magnets are in "flux off" position.

DESCRIPTION OF THE PREFERRED EMBODIMENTS

Referring to FIGS. 1 and 3 the motor consists of a rotatable rotor or armature 10 mounted upon a shaft 11 positioned in a set of end bearings 12. The bearings 12 are mounted in a pair of end bells 13 (FIG. 3).

The stator of the motor includes four magnet poles 14 composed of soft iron, i.e., iron in which there is a high degree of reversibility of magnetization. Each of the magnet poles has an inner surface 15 contoured to provide a curved surface concentric with the outer surface of the rotor 10 and spaced slightly therefrom to provide an air gap. Each magnet pole 14 also has at least one side surface 16 and an outer end surface 17. Surrounding the side surface 16 of each magnet pole is a rare earth magnet 18 which may be a single tubular magnet as shown in FIG. 2, a plurality of bar magnets as shown in FIGS. 4–6, or, where the pole pieces 14 are of circular cross-sectional configuration, a plurality of arc-shaped magnets.

As best shown in FIG. 2 the surface or surfaces of the magnet of magnets 18 in contact with a particular magnet pole 14 have the same polarity as shown by the letter "N" in FIG. 2 and the outer surfaces have the opposite polarity as shown by the letter "S" in FIG. 2. The outer surfaces of adjacent rare earth magnets 18 are joined by soft iron return path members 19.

Rare earth magnets 18 are characterized by their extremely high energy product as well as intrinsic coercive force. They function in the arrangement illustrated to concentrate magnetic flux in the air gap between each magnet pole 14 and the rotor 10. The term "rare earth magnet(s)" as used herein refers to magnets composed of treated cobalt-rare earth intermetallic compounds. The preparation of such compounds and magnets is disclosed in Benz U.S. Pat. Nos. 3,655,463, 3,655,464, 3,695,945, and Benz et al. U.S. Pat. No. 3,684,593, all of which are incorporated herein by reference. Typically, cobalt is present in atomic proportions of 5 to 1, 7 to 2 and 17 to 2. Samarium is one of the preferred rare earth elements but others may be used including mixtures of rare earths such as cerium mischmetal.

FIGS. 4–6 illustrate an embodiment in which rare earth magnets are used not only to direct magnetic flux but also to control magnetic flux. In these figures two oppositely disposed rare earth magnets identified as 18a are mounted for rotation by a series of ring gears 21 mounted on the end bell or housing 13. It is desirable that the rotatable rare earth magnets 18a have a cylindrical configuration in order to minimize clearances between the magnet poles 14 and return path members 19. The surfaces of the members 14 and 19 which abut the magnets 18a are provided with a conformation for mating engagement with the cylindrical surface of the magnets. The magnets 18a are magnetically oriented so that one side of an axial plane has one polarity and the other side of the plane has the opposite polarity.

FIG. 5 illustrates the orientation of the magnets 18a for providing maximum magnetic flux in the air gap between the rotor 10 and magnet poles 14. In this position operation of the machine is comparable to operation under the orientation illustrated in FIG. 2.

FIG. 6 illustrates the magnetic orientation when the rare earth magnets 18a are rotated 180° from their position illustrated in FIG. 5. Rotation of the magnets 18*a* has now produced a flux cancelling effect, insofar as the air gaps are concerned, due to the creation of the flux paths illustrated by the circular arrows of FIG. 6. At lesser degrees of rotation than 180° the flux directing effect of the rare earth magnets is reduced an amount corresponding to the degree of rotation. Thus, the embodiment of FIGS. 4–6 provides for a variable speed motor. In the case of a large motor the flux-off position illustrated in FIG. 6 enables the rotor 10 to be easily removed. Where magnetic forces tend to hold the rotor in place this can be quite a problem. The current practice is to supply a separate and costly excitation system to facilitate rotor or armature removal in service.

In a direct current motor utilizing the structure of this invention it is desirable to have flux density levels in the air gap of 10 kilogauss or higher. The saturation level of the soft iron pole pieces is 20 kilogauss. A magnet pole as disclosed herein was surrounded by four rare earth magnets as shown in FIG. 5. Each of the rare earth magnets operated near a maximum energy product density level of 4 kilogauss. The air gap was 0.060 inch. The flux density in the magnet pole adjacent to the gap was 16 kilogauss which decreased to 12 kilogauss in the center of the gap due to normal fringing flux distribution. Thus, the flux density in the air gap was essentially the sum of the flux densities provided by the four rare earth magnets.

The dynamoelectric machines of this invention must have at least two stator poles. The embodiment illustrated in FIG. 1 has four poles. Additional poles may be present the number being limited only by design requirements and space availability.

While the invention has been described with reference to certain embodiments it is obvious that there may be variations in structure which fall within the scope of the invention. Accordingly, the invention should be limited in scope only as may be necessitated by the scope of the appended claims.

What I claim as new and desire to secure by letters patent of the United States is as follows:

1. A dynamoelectric machine comprising:
   a rotor;
   a stator consisting of at least two permanent magnet poles composed of soft magnetic material having an inner surface spaced a short distance from said rotor to form an air gap, said poles also having at least one side surface and an outer surface;
   at least one rare earth magnet surrounding and in contact with the side surface of each of said magnet poles, the rare earth magnet having the portion of its surface in contact with its associated magnet pole of the same polarity as the magnet pole.

2. A dynamoelectric machine as claimed in claim 1 in which the rare earth magnets are composed of cobalt and samarium.

3. A dynamoelectric machine comprising:
   a rotor;
   a stator consisting of at least two permanent magnet poles composed of soft magnetic material, each pole having an inner surface spaced a short distance from said rotor to form an air gap, said magnet poles being of square cross-sectional configuration to provide four sides;
   a rare earth magnet positioned in proximity to each of the four sides of each magnet pole, the inner surfaces of oppositely disposed rare earth magnets having the same polarity and with the inner surfaces of at least one set of oppositely disposed magnets having the same polarity as their associated magnet pole;
   and magnetic return path elements connected to the surface of two oppositely positioned rare earth magnets at surfaces of said magnets opposite the said magnet pole.

4. A dynamoelectric machine as claimed in claim 3 which includes means to rotate two oppositely disposed rare earth magnets whereby the polarity of the rotatable rare earth magnets may be varied with respect to the nonrotatable rare earth magnets.

5. A dynamoelectric machine as claimed in claim 4 in which the means to rotate the two rare earth magnets consists of a ring gear.

6. A dynamoelectric machine as claimed in claim 4 in which the rare earth magnets are composed of cobalt and samarium.

* * * * *